United States Patent
Li et al.

(10) Patent No.: US 10,078,667 B2
(45) Date of Patent: *Sep. 18, 2018

(54) NORMALIZING NON-NUMERIC FEATURES OF FILES

(71) Applicant: INTERNATIONAL BUSINESS MACHINES CORPORATION, Armonk, NY (US)

(72) Inventors: Chang Sheng Li, Beijing (CN); Fan Jing Meng, Beijing (CN); Edith Helen Stern, Somers, NY (US); Han Wang, Troy, NY (US); Jing Min Xu, Beijing (CN); Lin Yang, Beijing (CN); Xuejun Zhuo, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 260 days.

This patent is subject to a terminal disclaimer.

(21) Appl. No.: 14/967,314

(22) Filed: Dec. 13, 2015

(65) Prior Publication Data
US 2016/0154793 A1    Jun. 2, 2016

Related U.S. Application Data

(63) Continuation of application No. 14/933,382, filed on Nov. 5, 2015.

(30) Foreign Application Priority Data

Nov. 28, 2014 (CN) .......................... 2014 1 0708694

(51) Int. Cl.
*G06F 17/30* (2006.01)
*H04L 12/24* (2006.01)

(52) U.S. Cl.
CPC .... *G06F 17/30477* (2013.01); *H04L 41/0806* (2013.01)

(58) Field of Classification Search
CPC ................ G06F 9/44505; G06F 8/427; G06F 17/30477; G06F 8/71; G06F 17/2809;
(Continued)

(56) References Cited

U.S. PATENT DOCUMENTS

| 8,990,148 B1 * | 3/2015 | Ziegler ............. G06F 17/30129 707/602 |
| 2006/0116862 A1 * | 6/2006 | Carrier .................. G06F 17/277 704/1 |

(Continued)

OTHER PUBLICATIONS

Wang, Han, Fan Jing Meng, Xuejun Zhuo, Lin Yang, Chang Sheng Li, and Jing Min Xu. "Learning from Metadata: A Fuzzy Token Matching Based Configuration File Discovery Approach." In Cloud Computing (Cloud), 2015 IEEE 8th International Conference on, pp. 405-412. IEEE, 2015.*

(Continued)

*Primary Examiner* — Taelor Kim
*Assistant Examiner* — Jesse P Frumkin
(74) *Attorney, Agent, or Firm* — Cantor Colburn LLP; Vazken Alexanian (57) ABSTRACT

Embodiments include method, computer program products and apparatuses for normalizing non-numeric features of files and corresponding apparatus. Aspects include segmenting at least one pair of positive instances of a non-numeric feature of a file into a number of tokens and -comparing the tokens in the at least one pair of positive instances to obtain matching tokens. Aspects also include calculating weights of their matching the file, for the matching tokens, and storing the tokens and their weights in a token base.

8 Claims, 9 Drawing Sheets

(58) Field of Classification Search
CPC .......... G06F 17/30914; H04L 41/0806; H04L 41/0803; H04L 41/08; H04L 41/0843; H04L 41/0846; H04L 41/0866; H04L 41/0853; H04L 41/0869; H04L 41/0873; H04L 41/0886; G06N 99/005
See application file for complete search history.

(56) References Cited

U.S. PATENT DOCUMENTS

| | | | | |
|---|---|---|---|---|
| 2009/0007083 | A1* | 1/2009 | Neogi | G06F 8/427 717/143 |
| 2009/0300054 | A1* | 12/2009 | Fisher | G06F 17/30569 |
| 2010/0023514 | A1* | 1/2010 | Parikh | G06F 17/2735 707/E17.001 |
| 2010/0223306 | A1* | 9/2010 | Liu | G06F 9/44505 707/822 |
| 2011/0276684 | A1* | 11/2011 | Singh | G06F 9/4856 709/224 |
| 2012/0198223 | A1* | 8/2012 | Tukol | G06F 9/4411 713/2 |
| 2013/0061208 | A1* | 3/2013 | Tsao | G06F 9/44 717/121 |
| 2013/0238768 | A1* | 9/2013 | Vaidya | H04L 67/14 709/220 |
| 2014/0101172 | A1* | 4/2014 | Dua | G06F 17/30557 707/750 |
| 2014/0245292 | A1* | 8/2014 | Balani | G06F 9/5077 718/1 |

OTHER PUBLICATIONS

Chang Sheng Li, et al., Pending U.S. Appl. No. 14/933,382 entitled "Normalizing Non-Numeric Features of Files," filed with the U.S. Patent and Trademark Office on Nov. 5, 2015.
List of IBM Patents or Patent Applications Treated as Related; (Appendix P), filed Dec. 13, 2015, U.S. Appl. No. 14/967,314; 2 pages.

* cited by examiner

Positive instances of file metadata for configuration item WASCellName

- ~/opt/IBM/WebSphere AppServer/profiles/Dmgr01/config/cells/bp m03Cell01/cell.xml
- ~/opt/IBM/WebSphere/Profiles/DefaultDmgr01/config/cells/TradeCell/cell.xml
- ~/opt/IBM/WebSphere/AppServer/profiles/AppSrv01/config/cells/localhostNode01Cell/cell.xml /opt/IBM/WebSphere/AppServer/porfiles/Dmgr01/config/cells/bpm03Cell01/cell.xml,access:755,uid:root,gid:root,size:886,accessTime:1395618029,changeTime:1366940004,modifyTime:1366939829
/opt/IBM/WebSphere/AppServer/porfiles/Custom01/config/cells/bpm04Cell01/cell.xml,access:644,uid:root,gid:root,size:886,accessTime:1395620245,changeTime:1367015344,modifyTime:1367013590
/opt/IBM/WebSphere/AppServer/porfiles/Custom01/config/cells/bpm03Cell01/cell.xml,access:644,uid:root,gid:root,size:886,accessTime:1395619775,changeTime:1366941421,modifyTime:1366939829
/opt/IBM/WebSphere/AppServer/porfiles/AppSrv01/config/vm-tmp-s169Node01cell/bpm03Cell01/cell.xml,access:755,uid:root,gid:root,size:918,accessTime:1395714053,changeTime:1363097164,modifyTime:1311863599
/opt/IBM/WebSphere/Profiles/DefaultCustom01/config/cells/TradeCell/cell.xml,access:644,uid:virtuser,gid:users,size:396,accessTime:1395715174,changeTime:1395296684,modifyTime:1395136511
/opt/IBM/WebSphere/Profiles/DefaultCustom01/config/cells/TradeCell/cell.xml,access:644,uid:virtuser,gid:users,size:396,accessTime:1395715293,changeTime:1396296325,modifyTime:1395136511
/opt/IBM/WebSphere/AppServer/porfiles/AppSrv01/config/cells/localhostNode01Cell/cell.xml,access:644,uid:root,gid:root,size:428,accessTime:1385952568,changeTime:1383905252,modifyTime:1383905252
/opt/IBM/WebSphere/AppServer/porfiles/AppSrv01/config/cells/vm81Node01Cell/cell.xml,access:644,uid:root,gid:root,size:423,accessTime:1385974685,changeTime:1383901184,modifyTime:1383901184
/opt/IBM/WebSphere/Profiles/managed02/config/cells/TradeCell/cell.xml,access:644,uid:root,gid:root,size:396,accessTime:1385976846,changeTime:1384322472,modifyTime:1384322089
/opt/IBM/WebSphere/Profiles/managed01/config/cells/TradeCell/cell.xml,access:644,uid:root,gid:root,size:396,accessTime:1385976848,changeTime:1384322360,modifyTime:1384322089
......

NORMALIZING NON-NUMERIC FEATURES OF FILES

PRIORITY

This application is a continuation of U.S. patent application Ser. No. 14/933,382, filed Nov. 5, 2015, the disclosure of which is incorporated by reference herein in its entirety, which claims priority to China Patent Application No. 201410708694.4; filed Nov. 28, 2014, and all the benefits accruing therefrom under 35 U.S.C. § 119, the contents of which in its entirety are herein incorporated by reference.

BACKGROUND

The present invention relates to the field of computer, more particularly, to a method and apparatus for normalizing non-numeric features of files.

Most modern software uses configuration files to provide flexibility to users, enabling users to customize configuration items based on their specific usage scenarios. For example, the users may customize the value of the configuration item, MaxClients (the maximum number of clients) in the configuration file, httpd.conf, in order to adjust the maximum number of clients simultaneously connected to the Apache HTTP server.

Some routine IT operations, e.g., application or data backup and recovery, workload transfer, file disaster recovery, are becoming more and more complex and challenging, since they are highly dependent on the identification of configuration files in a distributed environment. Therefore, there is a great demand to identify these configuration files in the existing environment to accomplish these common IT operations.

Due to their variability, multi-presence and massive amount, identifying configuration files is challenging, labor-intensive and error-prone. Existing solutions for configuration file discovery highly depend on extensive expert knowledge or highly intensive human interaction.

A conceivable method for automatically identifying configuration files is to use a classifier. A classifier is an algorithm or a corresponding apparatus, which can, after learning by using training data, determine whether an object belongs to a specific category based on a combination of features values of the object. Therefore, it can be conceived that the classifier can determine whether a file belongs to a configuration file based on the metadata like path, access permissions, size etc. of the file. However, since the classifier can only receive numeric features as input and cannot receive non-numeric features, non-numeric features of configuration files like file path cannot be used by the classifier to identify configuration files.

Thus, a solution for normalizing non-numeric features of files like configuration files to numeric features in order to identify configuration files is needed in the art.

SUMMARY

In an aspect of the present invention, there is provided a method for normalizing non-numeric features of files, comprising: segmenting at least one pair of positive instances of a non-numeric feature of a given file into a number of tokens; comparing the tokens in the at least one pair of positive instances to obtaining matching tokens; and for the matching tokens, calculating weights of their matching the given file, and storing the tokens and the weights in a token base.

In another aspect of the present invention, there is provided an apparatus for normalizing non-numeric features of files, comprising: a token segmenting module configured to segment at least one pair of positive instances of a non-numeric feature of a given file into a number of tokens; a token matching module configured to compare the tokens in the at least one pair of positive instances to obtain matching tokens; and a token base constructing module configured to, for the matching tokens, calculate weights of their matching the given file, and storing the tokens and their weights in a token base.

The technical solution of the present invention can normalize non-numeric features of files like file path to numeric features which can be used as input of a classifier, so as to facilitate effectively and automatically identifying files like configuration files.

BRIEF DESCRIPTION OF THE DRAWINGS

The above and other objects, features and advantages of the present invention will become more apparent by referring to the more detailed description of illustrative embodiments of the present invention below in conjunction with the accompanying drawings, in which like reference numerals denote like components throughout.

FIG. 2 shows a group of exemplary positive instances of file metadata;

DETAILED DESCRIPTION

Exemplary embodiments will be described in more detail with reference to the accompanying drawings, in which the embodiments of the present invention have been illustrated. However, the present invention can be implemented in various manners, and thus should not be construed to be limited to the embodiments disclosed herein. On the contrary, those embodiments are provided for the thorough and complete understanding of the present invention, and completely conveying the scope of the present invention to those skilled in the art.

Given the difference of file metadata in different environments and systems is not random but structural, e.g., the file path has a hierarchical structure and local sameness, making full use of such intrinsic characteristics of file metadata to extract tokens from the character string of metadata like file path, to create a token base and to calculate the similarity of the file metadata, so as to normalize the non-numeric features of the file metadata to numeric features for identifying configuration files.

Figure 1A:
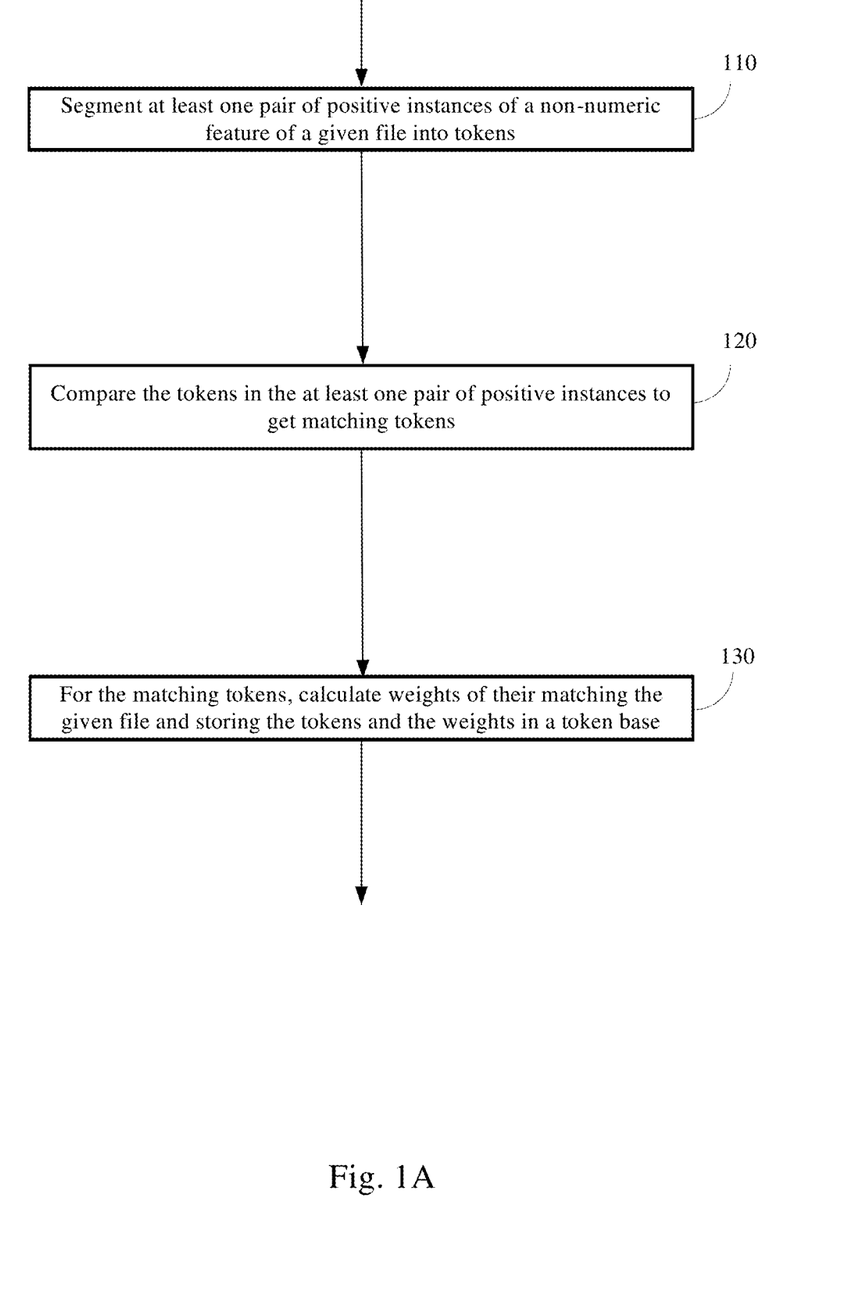
FIG. 1A shows a method for normalizing non-numeric features of files according to an embodiment of the present invention.

Now referring to FIG. 1A, it shows a method for normalizing non-numeric features of files according to an embodiment of the present invention. As shown at block 110, at least one pair of positive instances of a non-numeric feature of a given file are segmented into a number of tokens. As shown at block 120, the tokens in the at least one pair of positive instances are compared to get matching tokens. As shown at block 130, for the matching tokens, the weights of their matching the given file are calculated and the tokens and the weights thereof are stored in a token base.

Figure 1B:
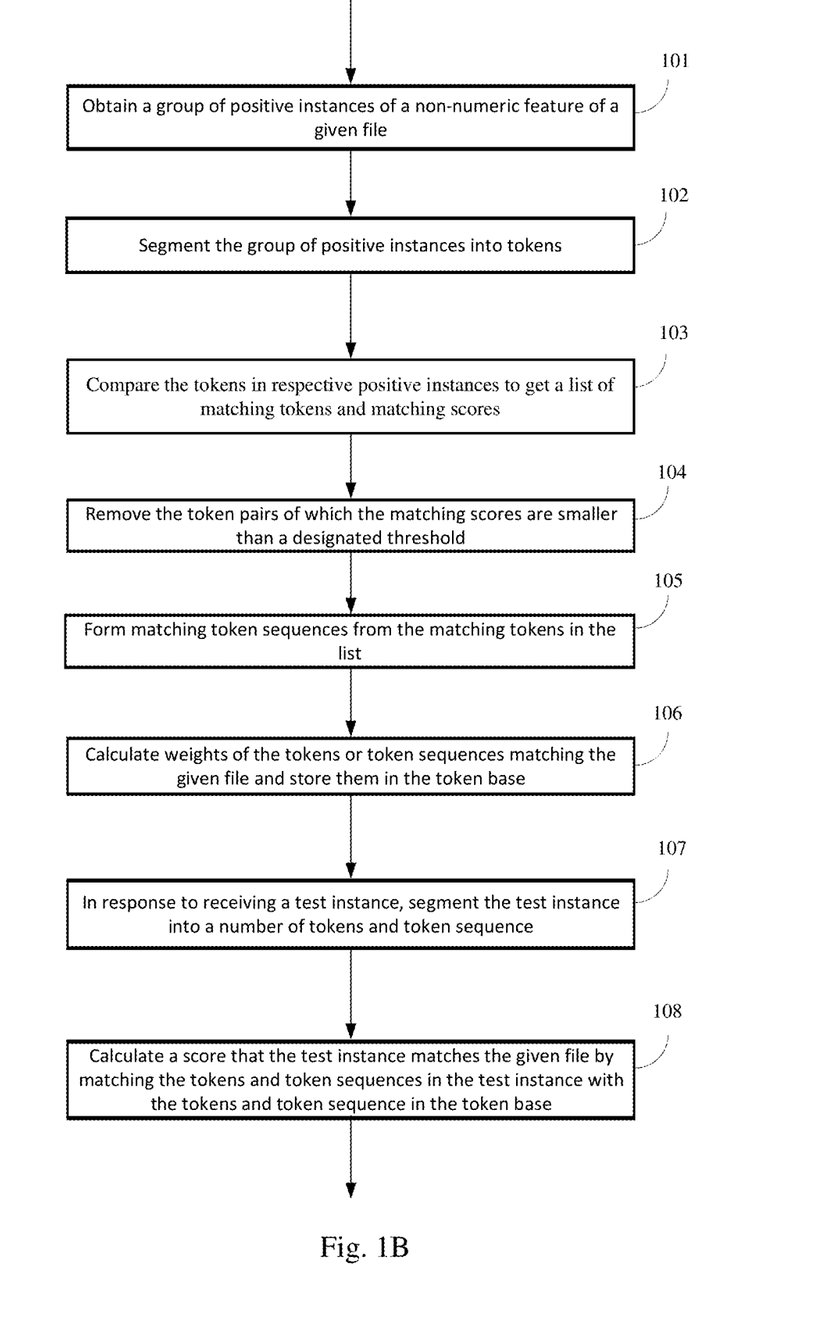
FIG. 1B shows the process of the method for normalizing non-numeric features of files according to an embodiment of the present invention in more detail.

Now referring to FIG. 1B, it shows a process of the method for normalizing non-numeric features of files according to an embodiment of the present invention in greater detail. As shown at block 101, a group of positive instances of a non-numeric feature of a given file, i.e., non-numeric metadata of the given file in different environments, which metadata are known positively to belong to the given file, are obtained. The given file is, e.g., a specific configuration file or a configuration file including a specific configuration item, and the non-numeric metadata is, e.g., a file path of the configuration file.

FIG. 2 shows a group of positive instances of exemplary file metadata. As shown in FIG. 2, the positive instances of the file metadata are positive instances of the file metadata for the configuration item WASCellName, i.e., metadata like file path, access permissions, access time of the configuration file including the configuration item in various environments. For example, positive instances of the file path as a non-numeric feature of the configuration file includes /opt/IBM/WebSphere/AppServer/profiles/Dmgr01/config/cells/bpm03Cell01/cell.xml, /opt/IBM/WebSphere/profile/DefaultDmgr01/config/cells/TradeCell/cell.xml, /opt/IBM/WebSphere/AppServer/profiles/AppSrv01/config/cells/localhostNode01Cell/ce ll.xml, ect.

Returning to FIG. 1B, as shown at block 102, a group of positive instances (e.g., file paths) of the non-numeric feature of the given file are segmented into tokens. This may be performed by using structural characteristics of the non-numeric feature per se of the given file. For example, symbol "/" may be used to segment the positive instance of each file path into different tokens.

As shown at block 103, the tokens in respective pairs of positive instances are compared to get matching tokens and their matching scores. That is to say, each positive instance is paired with at least one other positive instance, or any two positive instances are paired, and for each pair of positive instances, each token in one positive instance is compared with each token in the other positive instance, so as to get matching token pairs. Such comparison and matching may be performed by using the edit distance method etc, wherein a matching score between one token in a positive instance and each token in the other positive instance is calculated, and the token with the maximum matching score is selected as the matching token of the one token, so as to obtain the matching token pair and its matching score.

As shown at block 104, the token pairs of which the matching scores are smaller than a designated threshold are removed from the matching token pairs and their matching scores generated in block 103. As shown at block 105, token sequences are formed from the tokens in the matching token pairs formed at block 104, and the token sequences should be segments in the original positive instances. That is to say, the matching tokens in the updated list are combined in various way, and it is determined whether each combination is also a segment in the original positive instance; if yes, then the combination forms a matching token sequence.

Figure 3:
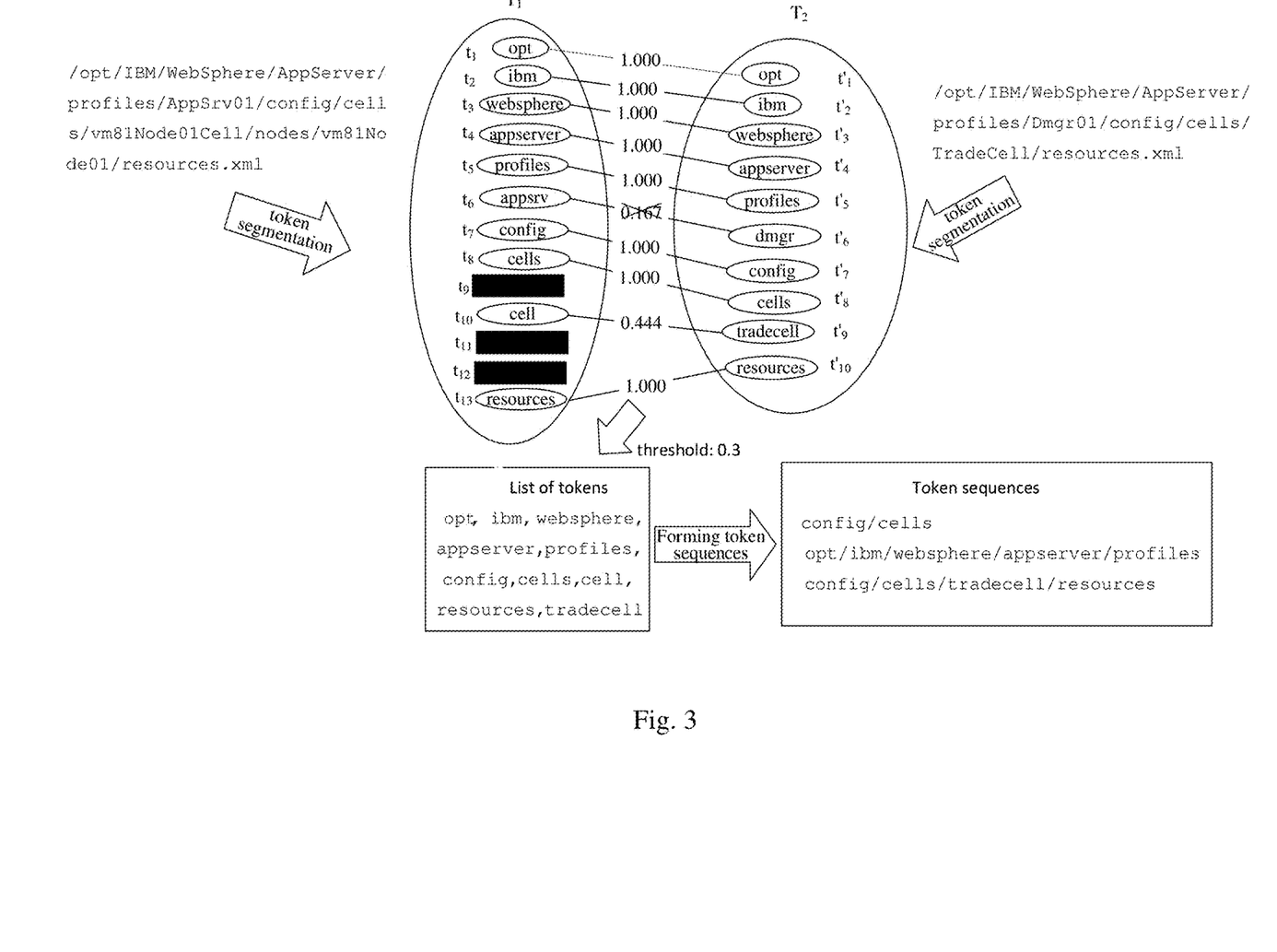
FIG. 3 shows an example of segmenting configuration file paths into tokens, comparing the tokens to get a list of matching tokens and matching scores thereof, and forming token sequences.

FIG. 3 shows an example of segmenting a configuration file path into tokens, obtaining a list of tokens and their matching scores and forming token sequences. FIG. 3 shows two positive instances of the same one configuration file, wherein a positive instance of a file path, /opt/IBM/WebSphere/AppServer/profiles/AppSrv01/config/cells/vm81Node01Cell/nodes/vm81Node01/resources.xml,is segmented into token group T1: opt,IBM, WebSphere, AppServer, profiles, AppSrv, config, cells, Node, Cell, nodes, Nodes, resources, and a positive instance of a file path, /opt/IBM/WebSphere/AppServer/profile/Dmgr01/config/cells/ TradeCell/resource.xml, is segmented into token group T2: opt, IBM, WebSphere, AppServer, profiles, Dmgr, config, cells, TradeCell, resources.

Then, each token in the token group T1 is matched with the tokens in token group T2 to calculate matching scores, and the token with the maximum matching score in T2 is obtained, so as to form matching token pairs. In these matching token pairs, opt in T1 is completely matching opt in T2, and the matching score thereof is 1. Tokens of Node, nodes and Node in T1 do not find matching items in T2, and the matching scores are null. The matching score of token appsrv in T1 and token dmgr in T2 is 0.167, and since the score is smaller than the designated threshold 0.3, this pair of tokens are eliminated. Finally the following matching token group is obtained: opt, IBM, WebSphere, AppServer, profiles, config, cells, cell, resources, tradecell.

Thereafter, the tokens in the matching token list are combined arbitrarily and compared with the original path to get a number of token sequences, e.g., opt/ibm/websphere/appserver/profiles, config/cells, config/cells/tradecell/resources, etc.

Returning to FIG. 1B, in block 106, for each token generated in block 104 and each token sequence generated in block 105 (if any), the weight of the token or the token sequence matching the given file is calculated, and they are stored in a token base. The weight represents to what extent the token or the token sequence represents the given file; in other words, when some file metadata includes the token or the token sequence, what is the possibility that the file metadata is metadata of the given file.

There are many ways to calculate the weight. In an embodiment of the present invention, the following formula is used to calculate the weight a token or a token sequence matching the give file:

$$weight = count\_coefficient \cdot \frac{count}{max\_count} + length\_coefficient \cdot \frac{length}{max\_length} + position\_coefficient \cdot position$$

In the above formula, weight denotes the weight to be calculated, count denotes the number of appearances of the token or token sequence in the group of positive instances, count_coefficient denotes a designated coefficient for the number of appearances, max_count denotes the number of instances in the group of positive instances, length denotes the token length of the token or the toke sequence, i.e., the number of tokens included in the token or token sequence, length_coefficient denotes a designated coefficient for the token length, max_length denotes the token length of the positive instance, i.e., the number of tokens included in the positive instance, position denotes the relative position of the token or token sequence in its positive instance, position_coefficient denotes a designated coefficient for the position, wherein the sum of count_coefficient, length_coefficient and position_coefficient is one. The count_coefficient, length_coefficient and position_coefficient may be designated the users according to their judgment as to the importance of the number of appearances of the token or the token sequence, the token length and position in matching a given file, wherein the more important the factor is, the greater the corresponding coefficient is. The relative position may be denoted, e.g., by the number of tokens preceding to the token or the token sequence in the positive instance or the ratio between this number of tokens and the total number of tokens in the positive instance.

The formula takes into account the roles of the number of appearances, the length and position of the token or the token sequence in matching the given file at the same time. Its significance lies in that the more number of appearances of a token or a token sequence in a positive instance of metadata of a given file is, the longer the length is and the more backward the position is, the more the token or the token sequence can match the give file.

Of course, in some embodiments of the present invention, the weight of the token or the token sequence matching the given file may be calculated according to any one or two of the number of appearances, the length and the position of the token or token sequence. That is to say, any one or two of the following three formulas may be used to calculate the weight of the token or token matching the given file:

$$weight = count\_coefficient \cdot \frac{count}{max\ count},$$

$$weight = length\_coefficient \cdot \frac{length}{max\ length},$$

$$weight = position\_coefficient \cdot position,$$

Then, each token and token sequence as well as their weights can be stored in association, e.g., in a token base. Optionally, the number of appearances, the length, and the position of each token and toke sequence may also be stored in association.

Figure 4:
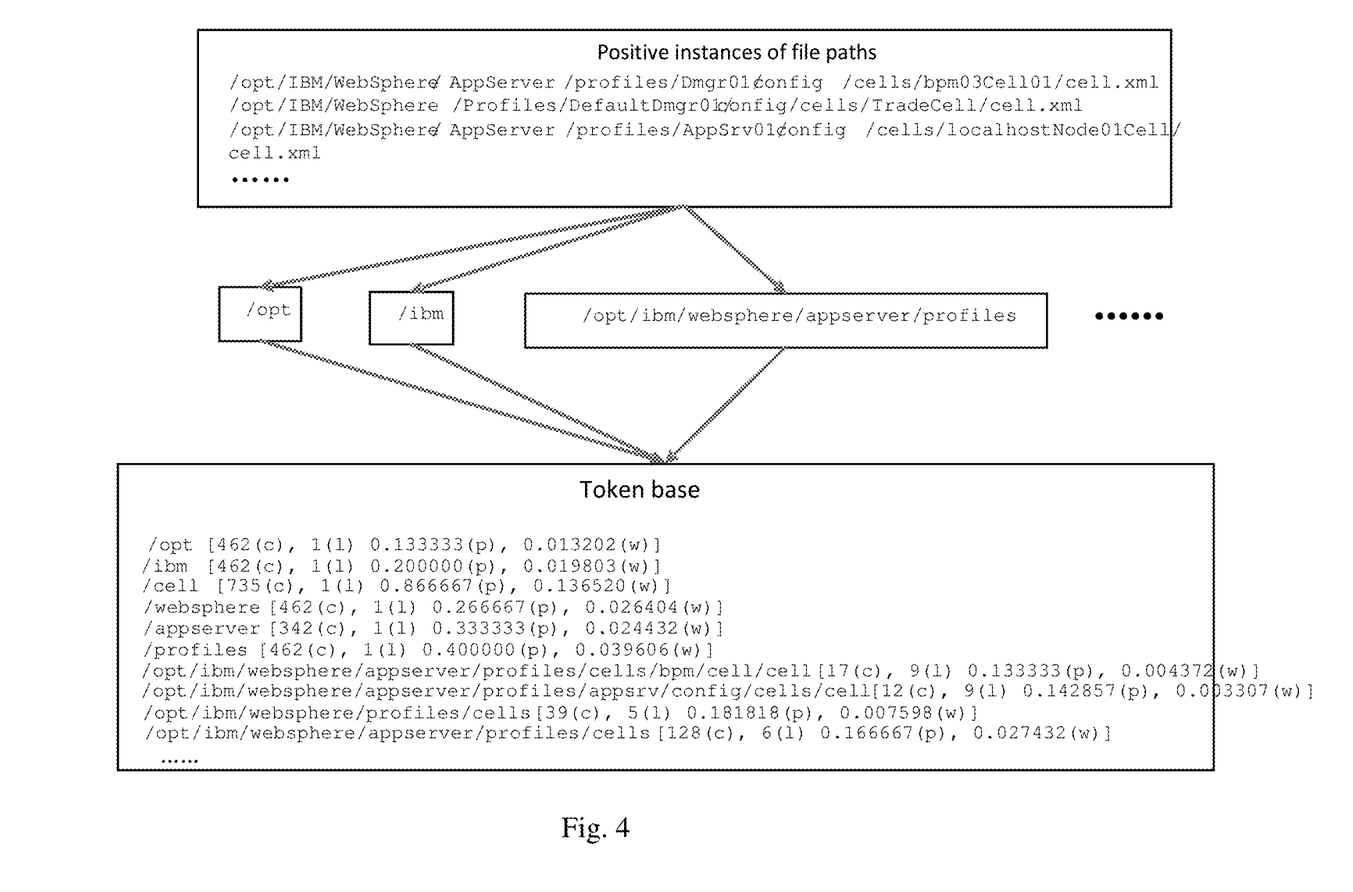
FIG. 4 shows an example of obtaining tokens and token sequences from a group of positive instances of metadata of a given file, so as to form a token base.

FIG. 4 shows an example of obtaining tokens and token sequence so as to form a token base from a group of positive instances of metadata of a given file. As shown in FIG. 4, tokens and token sequence, /opt, /ibm, /opt/ibm/websphere/appserver/profiles, etc. are obtained from a group of positive instances of a given file, and the weights of each token and token sequence are calculated, and each token and token sequence, as well as the number of appearances, the length, the position and the weight thereof are stored in association in a token base. For example, /opt[462(c), 1(l), 0.133333(p), 0.013202(w)] denotes that the number of appearances of token /opt in the positive instance is 462, with a length of 1, a position of 0.133333, and a weight of 0.013202; /opt/ibm/websphere/appserver/profiles/cells/bpm/cell/cell[17(c), 9(l), 0.133333 (p), 0.004372(w)] denotes that the number of appearances of token sequence /opt/ibm/websphere/appserver/profiles/cells/bpm/cell/cell in the positive instance is 17, with a length of 9, a position of 0.133333(p), and a weight of 0.013202, and the so on.

In this way, a token base is constructed and a data training process is accomplished. Thereafter, the formed token base may be used to identify a test file or normalize its non-numeric metadata into a numeric feature.

In addition, after the token base is constructed, new data may be further used to perform training. That is to say, in response to obtaining new positive instances of the metadata of the given file, the new positive instances may be used to enrich and update the token base. In such a case, similar to the above process, first the new positive instances may be segmented into tokens. Then, the tokens in each new positive instance may be compared and matched with the tokens in other instances, or tokens in the new instances may be compared and matched with the tokens in the token base, to calculate their maximum matching scores, and the tokens of which the maximum matching tokens are smaller than a designated threshold may be eliminated, and from the remaining tokens, token sequences as segments in the new positive instances may be formed, and then in combination with the matching tokens and token sequences as well as data like their number of appearances in the token base, the weight of each token and token sequence matching the give file may be re-calculated according to the new number of appearances, etc., and the numbers of appearances, weights etc. of the corresponding tokens and token sequences in the token base may be updated.

Returning to FIG. 1B, as shown at block 107, in response to receiving a test instance of the non-numeric feature of a test file, the test instance is segmented into the a number of tokens and token sequences. As shown at block 108, a score of the test instance matching the given file is calculated by matching the tokens and the token sequences in the test instance with the tokens and the token sequences in the token base. The score will be treated as a normalized numeric feature of the non-numeric feature of the test file.

In an embodiment of the present invention, the following specific steps may be used to match and calculate the tokens and token sequences in the test instance and the tokens and token sequences in the token base. As shown at block 801, different combinations formed by the tokens and token sequences of the test instance are obtained. As shown at block 802, each token and the token sequence in each combination is compared with the tokens and the token sequence in the token base, to get the most similar token or token sequence in the token base, as well as a similarity and the weight thereof. The similarity may be calculated using a method like edit distance.

As shown at block 803, for each combination, a weight of the combination is calculated according to the similarities and weights of the most similar tokens and token sequences of its tokens and token sequences. Specifically, the weight of each combination may be obtained by multiplying the similarity of the most similar token or token sequence of each token and token sequence in the combination with the weight thereof, and adding up the products. Nest, as shown at block 804, the maximum weight in the different combinations is obtained as a normalized numeric value of the test instance in terms of the non-numeric feature.

Figure 5:
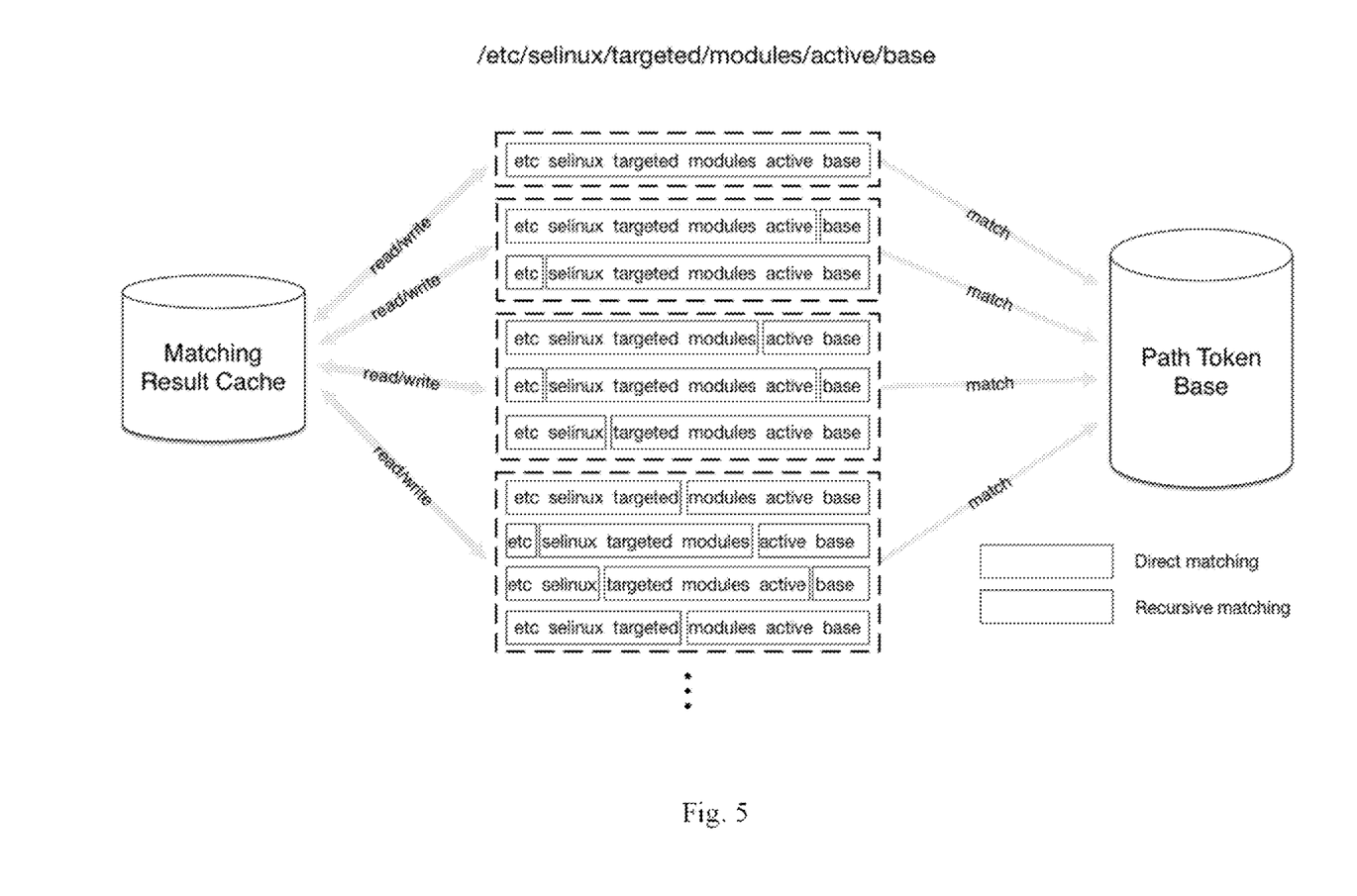
FIG. 5 shows an example of matching and calculating the tokens and token sequences of a test instance, and the tokens and token sequences in a token base.

FIG. 5 shows an example of matching and calculating the tokens and token sequences of a test instance with the tokens and token sequences in a token base. As shown in FIG. 5, the instance to be tested is /etc/setlinux/targeted/modules/active/base, and it is segmented into tokens of etc, setlinux, targeted, modules, active, base. Then, different combinations formed by the tokens and their sequences are obtained, e.g., the combination of the first line is a single token sequence, "etc setlinux targeted modules active base", the combination of the second line is a token sequence, "etc setlinux targeted modules active", and a token, "base"; the combination of the third line is a token "etc" and a token sequence, "setlinux targeted modules active base", and so on.

Then for each combination, the tokens and token sequences in the combination are compared respectively with the tokens and the token sequence in the token base, to get a similarity and the weight of the most similar tokens and token sequences. For example, the token sequence "etc setlinux targeted modules active" and the token "base" in the combination of the second line are compared respectively with the tokens and token sequences in the token base, to get a similarity and the weight of the most similar token sequence "etc setlinux targeted modules active" and token "base" in the token base.

Then, a weight of each combination is calculated according to the similarity and weight of the most similar token or token sequence of the tokens and token sequences of the combination. For example, for the combination of the second line, according to the similarity and weight of "etc setlinux targeted modules active" and the similarity and weight of token "base" in the token base, the weight of the combination of the second line is calculated. For example, the product of the similarity and weight of "etc setlinux targeted modules active" is added with the product of the similarity and weight of "base", to get the weight of the combination of the second line. In this way, each combination will get a weight. The maximum weight in the weights of the combinations is obtained as the score of the test instance matching the given file.

Figure 6:
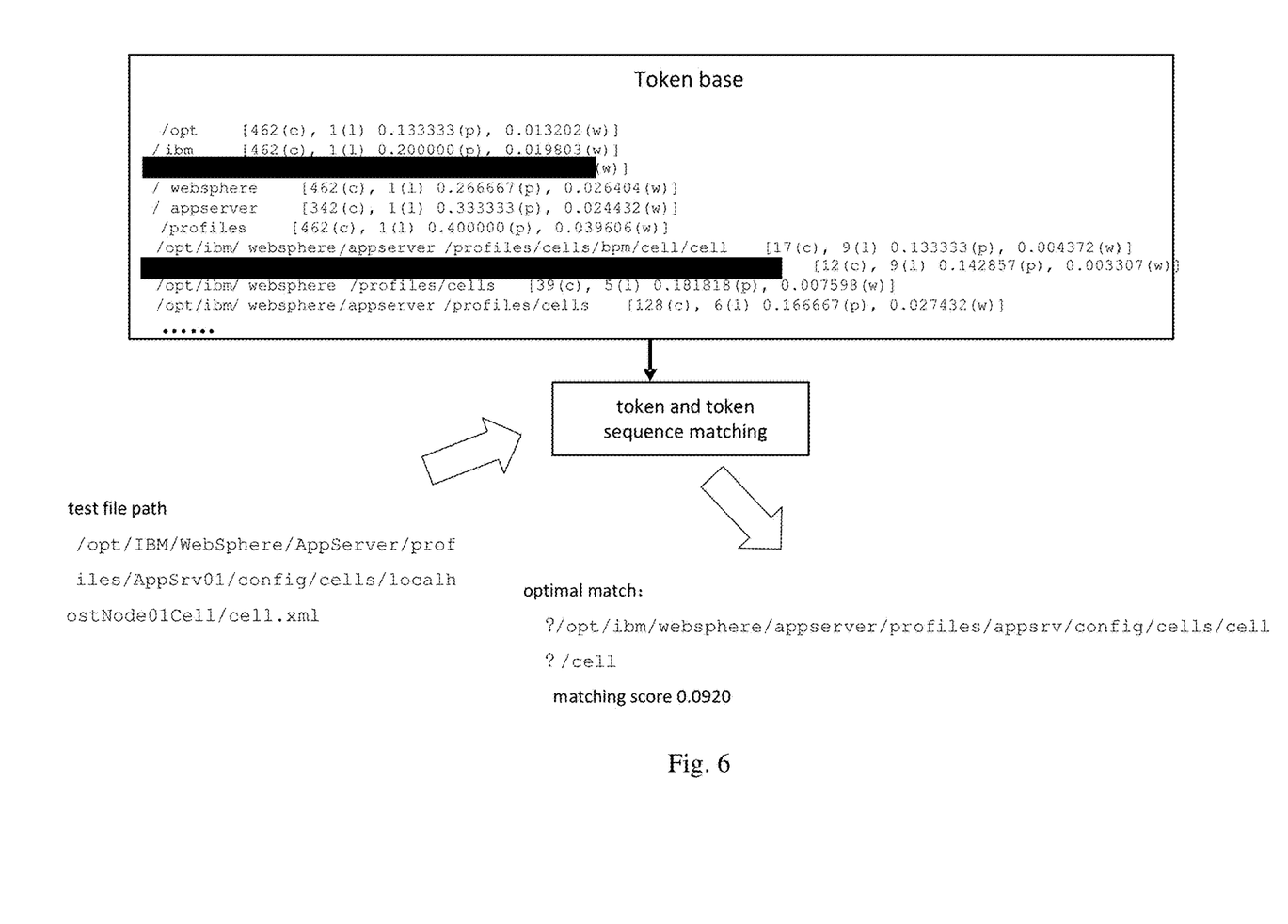
FIG. 6 shows an example of matching the tokens and token sequences in a test file path with the tokens and token sequences in a token base, so as to get the maximum matching score of the test file.

FIG. 6 shows an example of matching the tokens and the token sequences in a test file path with the tokens and token sequences in a token base, so as to get the maximum matching score of the test file. As shown in FIG. 6, the test file path is /opt/IBM/WebSphere/AppServer/profiles/AppSrv01/config/cells/localhostNode01Cell/cell.xml, and after it is segmented into different combinations of tokens and token sequences, the combination of the token sequence, "/opt/IBM/WebSphere/AppServer/profiles/AppSrv01/config/cells/localhostNode01Cell", and the token "cell", is similar to the token sequence, "/opt/ibm/websphere/appserver/profiles/appsrv/config/cells/cell" and token "cell", and their weights are 0.003307 and 0.136520 respectively, and according to the weights and the similarities the matching score of the test file may be obtained as 0.0920.

The score of the test instance matching the given file obtained in the above steps may be used as a numeric feature of the test file, so as to normalize the non-numeric feature of the test file into a numeric feature. The score of the test file may be used to determine whether the test file is the given file. For example, it may be considered that if the score is greater than or equal to a given threshold, the test file is determined to be the given file; and if the score is smaller than the given threshold, the test file is determined not to be the given file. In some embodiments of the present invention, the score of the test file may be provided as input to a classifier, and the classifier may determine whether the test file is the given file according to the score and other features of the test file. This method may be used to automatically identify configuration files, or used to automatically identify other types of files.

Above is described a method for normalizing non-numeric features of files according to embodiments of the present invention. It should be pointed out that the above description is merely exemplary, not limitation to the present invention. In other embodiments of the present invention, the method may have more, less or different steps and the relationships of sequence, inclusion, function etc. among the steps may be different from what is described and illustrated. For example, in some embodiments of the present invention, the method may not include forming token sequences from the matching tokens; and correspondingly, only for each token generated at block 104, the weight of the token matching the given file is calculated, and stored in the token base.

Figure 7:
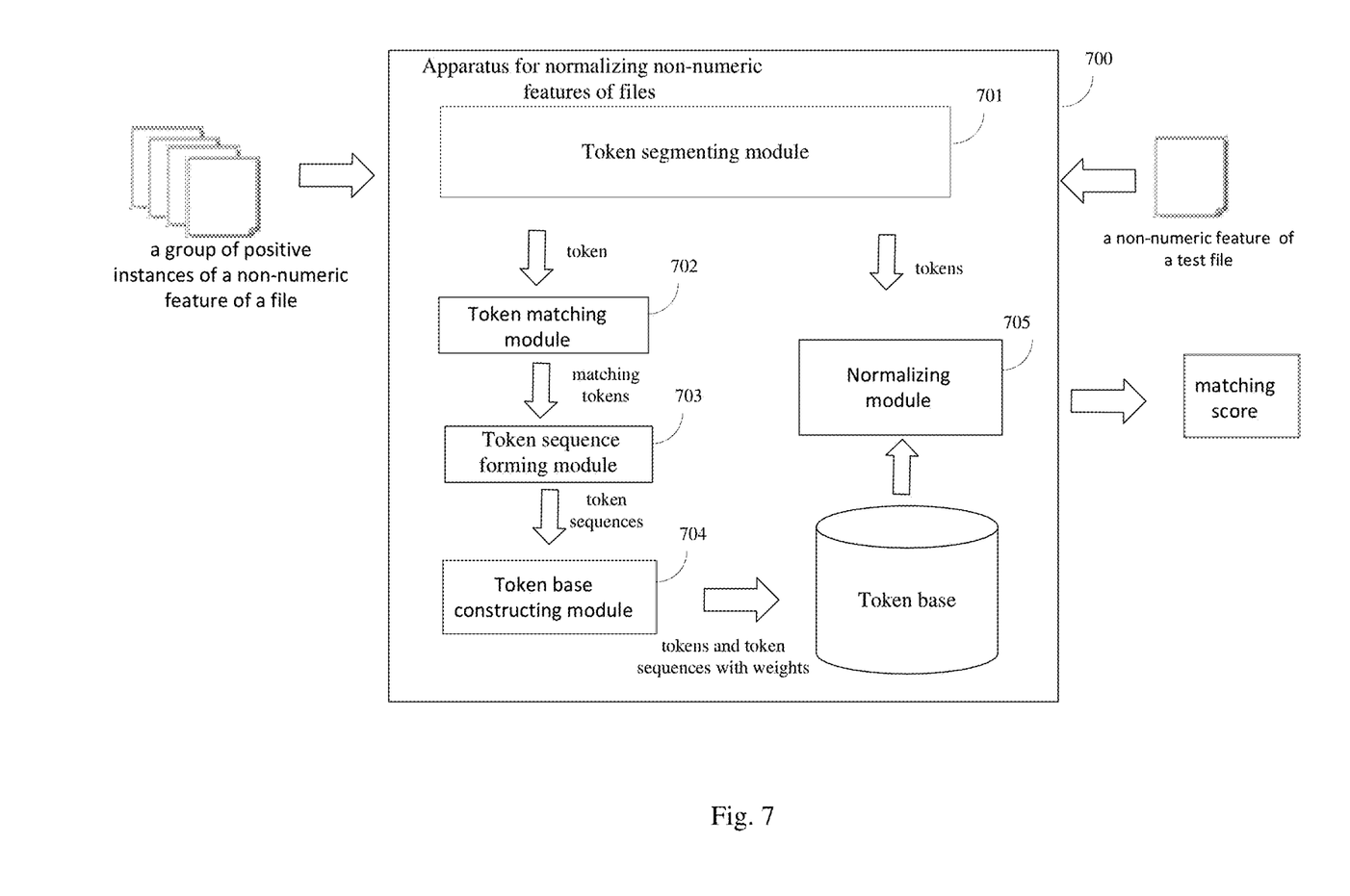
FIG. 7 shows an apparatus for normalizing non-numeric features of files according to an embodiment of the present invention.

Now referring to FIG. 7, it shows an apparatus for normalizing non-numeric features of files according to an embodiment of the present invention. The operation of the modules of the apparatus corresponds to the respective steps of the above method. For simplicity, part of the details repetitive with the above description are omitted from the description of the apparatus below. Therefore, more detailed understanding of the apparatus may be obtained by referring to the above description.

As shown, apparatus 700 for normalizing the non-numeric features of the files includes a token segmenting module 701 configured to segment at least one pair of positive instances of a non-numeric feature of a given file into a number of tokens, a token matching module 702 configured to compare the tokens in the at least one pair of positive instances to obtain matching tokens, and a token base constructing module 704 configured to, for each matching token, calculate a weight of its matching the given file and store the token as well as its weight in the token base.

According to an embodiment of the present invention, apparatus 700 further includes an optional token sequence forming module 703 configured to form token sequences from the matching tokens as segments of the positive instances and a token base construction module 704 further configure to, for each token sequence, calculate a weight of its matching the given file, and store the token sequence and its weight in the token base.

According to an embodiment of the present invention, apparatus 700 further includes a token segmenting module 701 further configured to, in response to receiving a test instance of the non-numeric feature of a test file, segment the test instance into a number of tokens and token sequences and a normalizing module 705 configured to, calculate a score that the test instance matches the given file by matching the tokens and token sequences in the test instance with the tokens and token instances in the token base, as a normalized numeric feature of the non-numeric feature of the test file.

According to an embodiment of the present invention, the segmenting the positive instances into a number of tokens and segmenting the test instance into a number of tokens and token sequences are performed by using structural characteristics of the non-numeric feature.

According to an embodiment of the present invention, the token matching module 702 includes: a token matching score calculating sub-module configured to, calculate the maximum matching score between each token in a positive instance with the tokens in another positive instance and a token selecting sub-module configured to select the tokens of which the maximum matching scores are larger than the given threshold, so as to obtain the matching tokens.

According to an embodiment of the present invention, the token base constructing module 704 includes a weight calculating sub-module configured to, according to at least one of the number of appearances of the matching token or token sequence in the group of positive instance, the token length of the token or the token sequence, and the token position of the token or the token sequence in the positive instance, calculate a weight of its matching the given file, wherein the greater the number of appearances is, the greater the token length is or the more backward the token position is, the greater the weight is.

Above is described an apparatus for normalizing non-numeric features of files according to embodiments of the present invention. It should be pointed out that the above description is merely exemplary, rather than restriction to the present invention. In other embodiments of the present invention, the apparatus may have more, less or different modules, and the relationships of connection, inclusion and function etc. among the modules may be different from what is described and illustrated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 8:
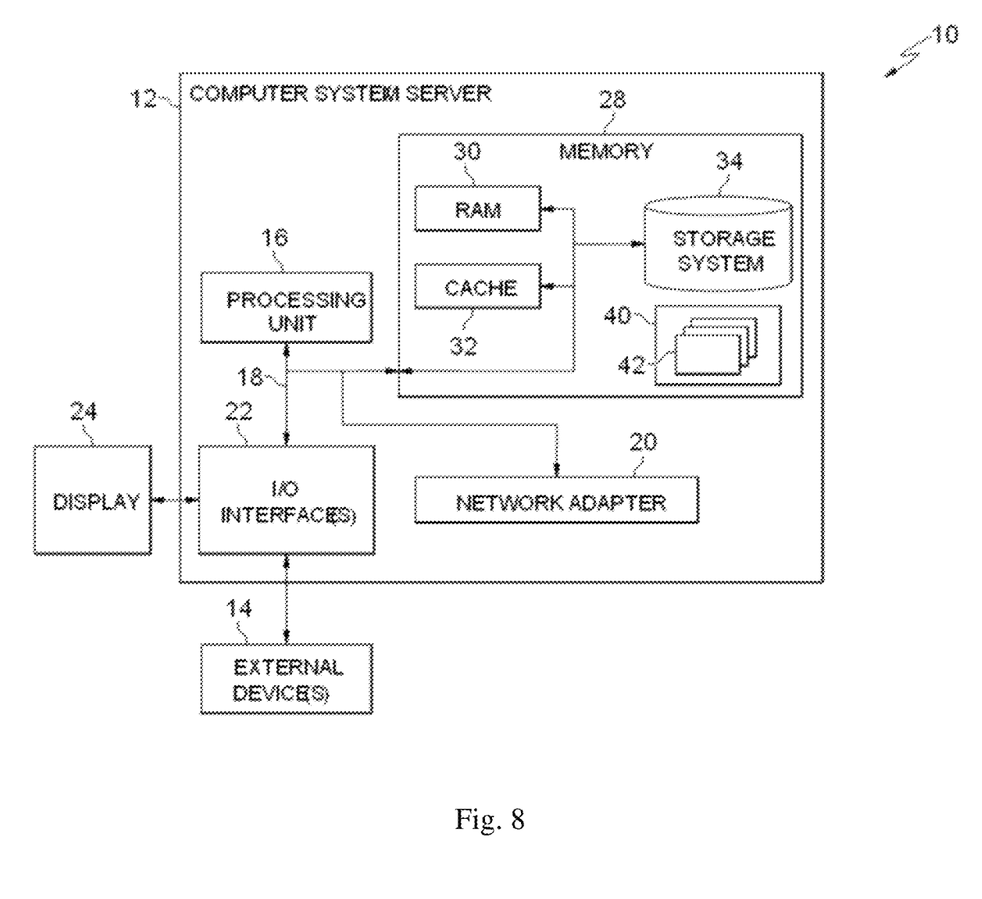
FIG. 8 shows a block diagram of an exemplary computer system/server which is applicable to implement embodiments of the present invention.

Referring now to FIG. 8, in which an exemplary computer system/server 12 which is applicable to implement the embodiments of the present invention is shown. Computer system/server 12 is only illustrative and is not intended to suggest any limitation as to the scope of use or functionality of embodiments of the invention described herein. As shown in FIG. 8, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method for normalizing non-numeric features of files, comprising:
   segmenting at least one pair of positive instances of a non-numeric feature of a file into a number of tokens, wherein the non-numeric feature of the file comprises a file storage path of a configuration file stored in a networked computer environment;
   comparing the tokens in the at least one pair of positive instances to obtain matching tokens by:
      calculating the maximum matching score between each token in a positive instance with the tokens in another positive instance;
      selecting the tokens of which the maximum matching scores are greater than a given threshold, to get the matching tokens; and
   for each of the matching tokens, calculating weights of their matching the file, and storing the tokens and their weights in a token base, wherein the matching tokens identify similar configuration files stored in different locations in the networked computer environment.

2. The computer-implemented method of claim 1, further comprising:
   forming token sequences from the matching tokens as segments of the positive instances; and
   for each of the token sequences, calculating weights of their matching the file, and storing the token sequences and their weights in the token base.

3. The computer-implemented method of claim 2, further comprising:
   in response to receiving a test instance of the non-numeric feature of a test file, segmenting the test instance into a number of tokens and token sequences;
   calculating a score that the test instance matches the file by matching the tokens and the token sequences in the test instance with the tokens and token sequences in the token base, as a normalized numeric feature of the non-numeric feature of the test file.

4. The computer-implemented method of claim 3, wherein calculating a score that the test instance matches the file by matching the tokens and the token sequences in the test instance with the tokens and the token sequences in the token base comprises:

obtaining different combinations formed by tokens and token sequences of the test instance;

comparing each token and token sequence in each combination with the tokens and token sequences in the token base, to get the most similar token or token sequence in the token base, and a similarity and the weight thereof;

for each combination, according to the similarities and weights of the most similar tokens or token sequences of its tokens and token sequences, calculating a weight of the combination; and obtaining the maximum weight in the different combinations, as the score that the test instance matches the file.

5. The computer-implemented method of claim 3, further comprising:

determining whether the test file is a given file according to the normalized numeric features of the test file.

6. The computer-implemented method of claim 5, wherein the determining whether the test file is the give file according to the normalized numeric feature of the test file comprises:

providing the normalized numeric feature of the test file to a classifier to determine whether the test file is the file.

7. The computer-implemented method of claim 1, wherein segmenting the positive instance into a number of tokens is performed by using structural characteristics of the non-numeric feature.

8. The computer-implemented method of claim 1, wherein for a matching token or token sequence, calculating a weight of its matches the file comprises:

according to at least one of the number of appearances of the matching token or token sequence in the group of positive instance, the token length of the token or the token sequence, and the token position of the token or the token sequence in the positive instance, calculating a weight of its matching the file, wherein the greater the number of appearances is, the greater the token length is or the more backward the token position is, the greater the weight is.

* * * * *